Nov. 24, 1931.       E. GATTINO       1,833,566
APPARATUS FOR DELIVERING COINS AND SMALL ARTICLES
Filed March 20, 1930
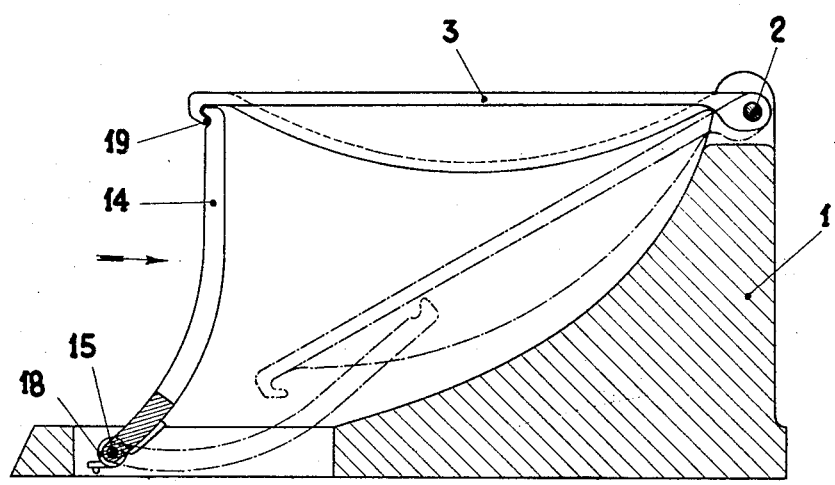
EDGARDO GATTINO
by his attorney
Emil Bonnelyche Patented Nov. 24, 1931

1,833,566

UNITED STATES PATENT OFFICE

EDGARDO GATTINO, OF TURIN, ITALY

APPARATUS FOR DELIVERING COINS AND SMALL ARTICLES

Application filed March 20, 1930, Serial No. 437,421, and in Italy March 22, 1929.

This invention relates to apparatus for delivering coins or other small articles into the hands of a person.

An object of the invention is to provide an apparatus of this kind which will operate satisfactorily with a very simple construction.

Apparatus of this kind is known comprising a support in the form of a cup or the like in which the articles to be delivered are placed, this cup being mounted in such a way that it can swing under the action of a thrust exerted against the same. In a device of this kind in which the cup rocks on a pivot, there is the disadvantage that if subjected to a sudden push the articles in the cup will be projected to a distance. If the cup is mounted on a jointed parallelogram the construction becomes excessively complicated and fragile.

According to the present invention the cup is pivoted about an axis at one of its ends or which does not traverse its center of gravity, and it is supported at its other end by a movable member which can be manually operated to permit the cup to swing downwards on its pivot and thus deliver into the hands of the user the coins or other objects placed therein.

This construction obviates any violent projection of the articles from the apparatus because these articles can receive only a descending motion.

A preferred construction of the apparatus according to the invention is illustrated by way of example in the single figure of the accompanying drawing.

In this figure, 1 indicates the base or stand of the apparatus on which there is pivoted on a pivot 2, at one of its ends, a cup or pan 3. This pan is supported in horizontal position by an upright member 14 pivoted on a pivot 15 to the base 1 which upright 14 is held in normal position by a torsion spring 18. The pan 3 is held engaged with the upright 14 by means of a hook-like projection 19 which engages a notch in the top of the upright 14.

To use this apparatus, when coins or other small articles are placed in the pan 3, the operator will push against the upright 14 in the direction of the arrow, thereby releasing the pan 3 which will rock on its pivot by the action of gravity and empty its contents into the hand which has effected the operation, without any danger of throwing the articles upwardly.

What I claim as my invention and desire to secure by United States Letters Patent is:

1. An apparatus for delivering small articles into the hand, comprising a stand, a pan pivoted on said stand with the axis of the pivot removed from the center of gravity of the pan, and a member mounted under said pan to support it in horizontal position, said member being manually movable to release said pan and permit it to oscillate downward on its pivot by gravity.

2. An apparatus for delivering small articles into the hand, comprising a stand, a pan pivoted thereon with the axis of the pivot removed from the center of gravity of the pan, a member mounted under said pan to support it in horizontal position, said member being manually movable to release said pan and permit it to oscillate downward on its pivot by gravity, and means for restoring the movable parts to normal position.

3. An apparatus for delivering small articles into the hand comprising a stand, a pan pivoted at its rear end on said stand, and a member mounted in said stand under said pan and supporting the pan on its forward end, said member being manually movable to release said pan and permit it to oscillate downwardly about its pivot.

In testimony whereof, I affix my signature.

EDGARDO GATTINO.